W. J. McCLELLAND.
Lozenge Machine.

No. 28,239.

Patented May 8, 1860.

UNITED STATES PATENT OFFICE.

W. J. McCLELLAND, OF NEW YORK, N. Y., ASSIGNOR TO ERNEST GREENFIELD, OF SAME PLACE.

MACHINE FOR CUTTING LOZENGES.

Specification of Letters Patent No. 28,239, dated May 8, 1860.

*To all whom it may concern:*

Be it known that I, W. J. McCLELLAND, of New York, in the county and State of New York, have invented a new and Improved Machine for Cutting Lozenges; and I do hereby declare that the following is a full, clear, and exact description thereof, reference being had to the accompanying drawings, forming a part of this specification, in which—

Figure 1:
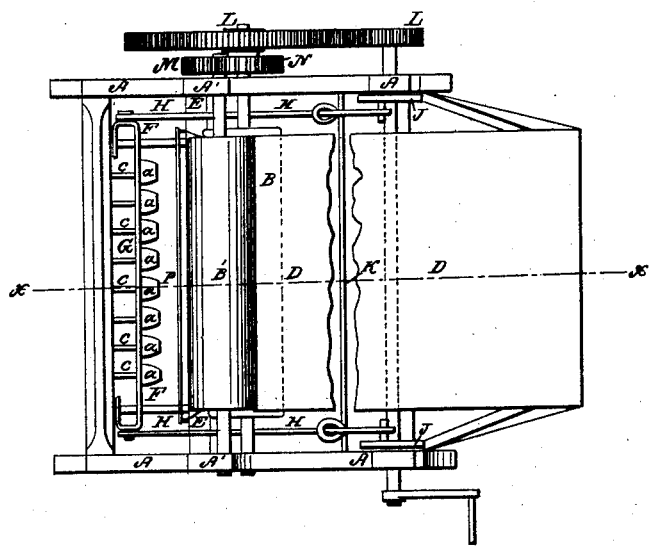
Figure 2:
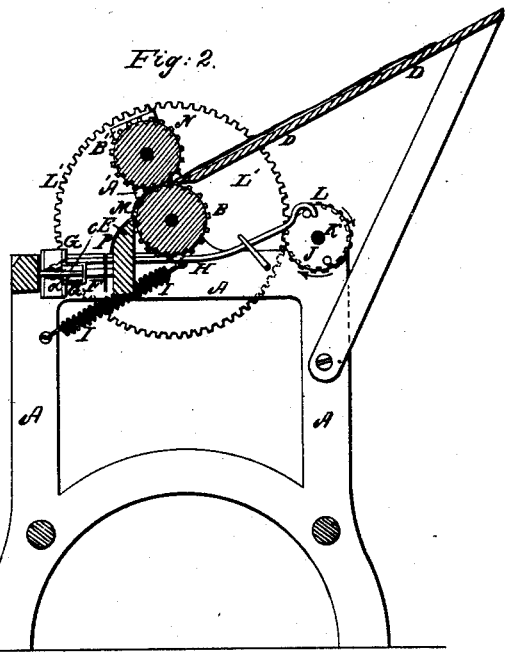

Figure 1, represents a top view of the machine in question. Fig. 2, a vertical longitudinal section taken through Fig. 1, as indicated by the red line $x$, $x$, marked thereon.

Similar letters of reference indicate corresponding parts in both figures.

The object to be attained by my invention is to perform the work of rolling a paste, into which the lozenge compound is made, and making it of the required uniform thickness, and then stamping out the lozenges therefrom, by machinery suitably adapted to this purpose.

The invention consists in the employment of a gang of cutters, either round, square, or oval arranged on suitable guide bars, and receiving an alternate reciprocating motion imparted to them by eccentric or pin wheel and spring movement, and arranged in such a relation to a fixed plate, placed parallel with the ends of the cutters, and with suitable feed rollers, that the sheet of paste will be fed down before the cutters at each movement of the same, the lozenges will be cut therefrom, and punched out of the cutters in their receding movement from the fixed plate, all in the manner and for the purpose hereinafter described and represented.

To enable those skilled in the art to fully understand my invention, I will proceed to describe its construction and operation.

In the drawings, A, represents a frame of a suitable length and of a width in accordance with the number of cutters to be used. From about midway of this frame, and on each side of it proceed up two inclined arms A', A', in which are placed suitable bearing boxes for the lugs of feed and graduating rollers B, B'. The upper roller is made adjustable for the purpose of giving a uniform thickness to the paste as it passes under it and between the two rollers B, B'.

D, is an inclined table upon which the sheet of paste is laid and down which it is conducted by its own gravity assisted by the feed motion of the rollers B, B'.

E, is a fixed plate extending across the frame, the surface of which is parallel with the rollers B, B'. The top edge of this plate is beveled to a sharp edge, which being placed along the roller B, and in contact with the surface of this roller, serves to scrape the adhering paste if any, from this roller. Against this plate E, the paste is cut up as it passes down over it in descending from the rollers B, B'.

The cutting of the paste into lozenges is performed by the gang of tubular cutters $a$, $a$, $a$, which are each fixed at their rear ends to a transverse cutter head G, which works back and forth on parallel guide rods F, F, and receives this alternate reciprocating motion from connecting rods H, H, and springs I, I, the former being actuated by pin wheels J, J, on shaft K, for drawing the cutters up to, and in a parallel line with the plate E, while the latter returns the cutters back to their former position. The approaching movement of the cutter head and cutters will thus be somewhat slower than their receding movement.

On one end of the shaft K, is keyed a pinion spur wheel L, which engages with the teeth of a large wheel L', that is keyed to the shaft of the lower roller B, and on this shaft is placed a pinion M, which engages with pinion N. These two pinions give motion to the rollers B, B', which motion should be regulated so as to work harmoniously with that of the cutters.

P, is a plate, fixed at a short distance from and parallel to the plate E, having perforations in it corresponding to the ends of the cutters, through which holes the ends of the cutting tubes pass in their movement up to the plate E.

$c$, $c$, $c$, are plungers or punching heads that are all fixed to a cross bar of frame A, and pass through, or nearly through the tubes $a$, $a$, $a$, when they have returned from the plate E, each carrying a lozenge. The office of these punches is to throw out the lozenges from the tubes before they return to receive another supply from the sheet of paste.

Having thus described the several essential parts of my machine I will proceed to describe its construction and operation. The paste is placed on table D, in thin sheets, and the shaft K, is set in motion, rotating in the direction of the arrow, of Fig. 2; the spin wheel L, gives motion to the rollers B, B', and they draw the paste between them and pass it down over the plates E, as represented in Fig. 2, in the desired uniform thickness, the gang of cutters $a$, $a$, are then brought up to the plate E, cutting through the paste, and in their receding movement the scraps are prevented from following them by the fixed perforated plate P. The plungers $c$, $c$, then perform their work of discharging the lozenges from each cutter, when the cutters are ready to repeat the operation, which can be performed as rapidly as the cutters can be moved back and forth.

Having thus described my invention, what I claim and desire to secure by Letters-Patent, is—

1. The combination of rollers B, B', and plate E, with the reciprocating cutters $a$, $a$, $a$, and plungers $c$, $c$, $c$, arranged in a suitable relation to each other, and operating substantially as and for the purposes herein set forth.

2. The perforated plate P, interposed between the plate E, and cutters $a$, $a$, $a$, for clearing the scraps from the cutters substantially as set forth.

WM. J. McCLELLAND.

Witnesses:
  WM. TUSCH,
  M. M. LIVINGSTON.